United States Patent [19]
Iwata

[11] 3,820,033

[45] June 25, 1974

[54] MOS-FET SAMPLE AND HOLD SYSTEM FOR DIGITIZING HIGH FREQUENCY SIGNALS

[75] Inventor: Hideki Iwata, Portland, Oreg.

[73] Assignee: Tektronix, Incorporated, Beaverton, Oreg.

[22] Filed: May 16, 1973

[21] Appl. No.: 360,876

[52] U.S. Cl. .............. 328/151, 307/235 R, 307/246, 307/251, 307/261, 328/147, 328/165

[51] Int. Cl. ...... H03k 17/16, H03k 5/20, H03k 5/13

[58] Field of Search ............ 307/235 R, 235 A, 240, 307/246, 251, 261, 268; 328/146, 147, 150, 151, 165

[56] References Cited

UNITED STATES PATENTS

| | | | |
|---|---|---|---|
| 3,116,458 | 12/1963 | Margopoulos | 328/151 X |
| 3,555,298 | 1/1971 | Neelands | 328/146 X |
| 3,584,309 | 6/1971 | Nicolson | 328/151 X |
| 3,603,814 | 9/1971 | Ohashi | 307/240 |
| 3,636,378 | 1/1972 | Ohashi | 307/251 |
| 3,646,364 | 2/1972 | Kaminski | 307/251 |
| 3,701,059 | 10/1972 | Nyswander | 328/167 X |
| 3,701,909 | 10/1972 | Holmes et al. | 328/151 X |
| 3,723,771 | 3/1973 | McLean | 328/151 X |

OTHER PUBLICATIONS

Dersch, "Voiced Sound Detector," IBM Tech. Discl. Bull.; Vol. 5, No. 3, p. 46, 8/1962.

*Primary Examiner*—Rudolph V. Rolinec
*Assistant Examiner*—L. N. Anagnos
*Attorney, Agent, or Firm*—Adrian J. La Rue

[57] ABSTRACT

A MOS-FET sample and hold circuit to eliminate spike noise and offset voltage errors having single or difference sampling is provided.

17 Claims, 2 Drawing Figures

MOS-FET SAMPLE AND HOLD SYSTEM FOR DIGITIZING HIGH FREQUENCY SIGNALS

BACKGROUND OF THE INVENTION

Metal oxide semiconductor type field effect transistors, hereinafter referred to as MOS transistors, are in great use in all types of circuit technology. Basically the MOS transistor has the advantage of low forward resistance in the on condition as well as a low gate to drain interelectrode capacitance as compared to a junction field effect transistor.

Generally, in a switching or sampling circuit, these MOS transistors are switched from a state of nonconduction to a state of conduction or vice versa. Such conditions are usually associated with the so called spike noise generated by interelectrode capacitances of the MOS transistor when operated as described above. Further, associated with spike noise is an offset voltage produced in the output signal which decreases the overall sensitivity of any equipment used in conjunction with the MOS transistors. To compensate for spike noise, hence reduce offset voltage, it is common to use discrete components. These components however, produce thermal and long term instability and make balancing difficult.

In prior art, the above identified problems associated with the MOS transistors were eliminated in a number of ways. One such method is the use of resistors and a differential amplifier to equally distribute the effects of interelectrode capacitance with a resultant null as described in U.S. Pat. No. 3,646,364 by William Kaminski. Another method is to provide a series-shunt-type circuit to eliminate any offset voltage due to spike noise as described in U.S. Pat. No. 3,636,378 by Shin-Ichi Chashi et al. A further method prevents effective current conduction internally between the substrate and the electrodes of the MOS transistor as described in U.S. Pat. No. 3,564,288 by Douglas M. Bauer.

It is also well-known that a MOS transistor becomes unstable at high frequencies because of feedback through the interelectrode capacitance previously discussed. In the prior art this has been overcome by providing a tuning terminal connected to the common drain and source, whereby the interelectrode capacitance could be neutralized.

SUMMARY OF THE INVENTION

The present invention overcomes the above described problems associated with MOS transistor circuits by providing single or difference sampling techniques whereby an input signal to be sampled is sampled twice in response to a trigger pulse having a direct relationship to the sampled signal.

It is therefore one objective of the present invention to provide a MOS transistor sample and hold system adapted for use with input signals having a wide frequency domain.

Another objective of the present invention is to provide a MOS transistor sample and hold system having improved thermal and long term stability.

It is yet another object of the present invention to provide a MOS transistor sample and hold system adapted for use with input signals having a wide amplitude domain.

It is still another objective of the present invention to provide a MOS transistor sample and hold system which is inherently balanced.

It is still yet another objective of the present invention to provide a MOS transistor sample and hold system having no transient noise components in the output thereof.

The subject matter of the present invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference elements characters refer to like elements.

DETAILED DESCRIPTION OF THE INVENTION

Figure 1:
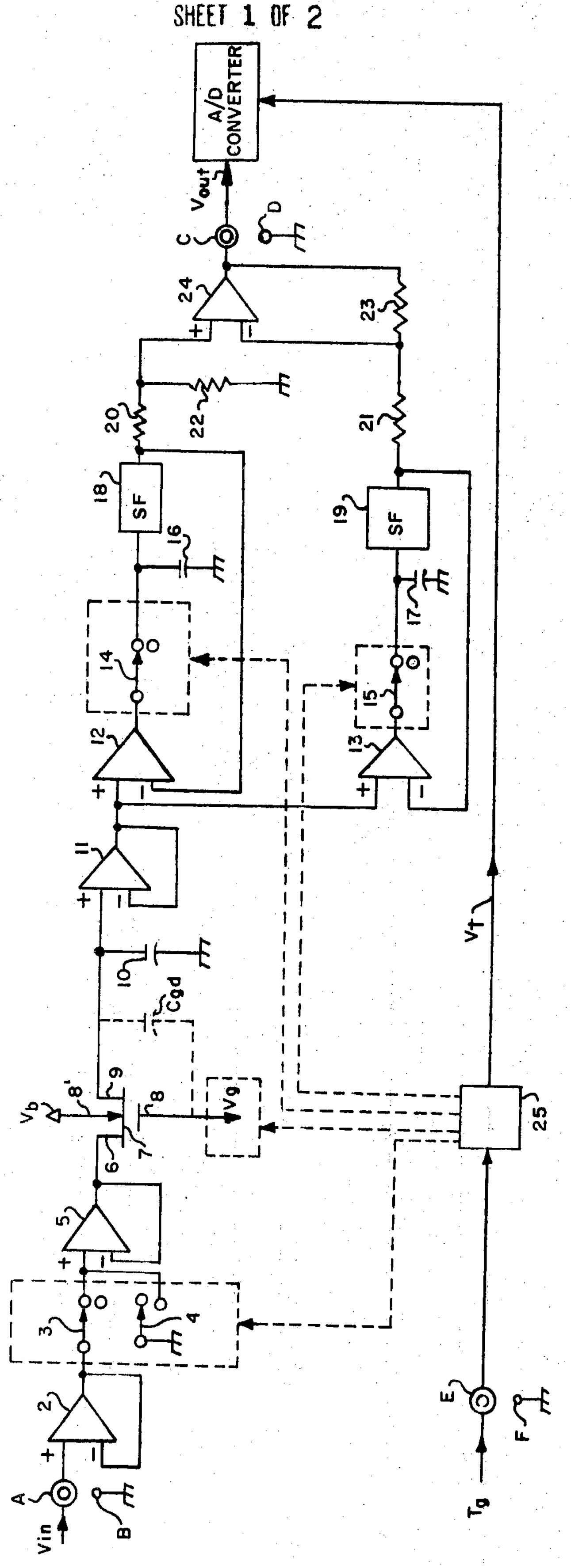
FIG. 1 is a block diagram of the MOS-FET sample and hold system for digitizing high frequency signals.

Referring to the drawings, and in particular FIG. 1, a block diagram of the preferred embodiment is shown.

A signal $V_{in}$ to be sampled is applied between an input terminal A and a ground terminal B so that the signal $V_{in}$ is applied to the non-inverting + input of a high impedance, low drift amplifier 2. Amplifier 2 may be similar to one of several as described in "Vertical Amplifier Circuits," First Edition, Dec. 1969, Tektronix, Inc. The output of said amplifier being connected back to the inverting − input of said amplifier and to a switch 3. Amplifier 2 serves as an input buffer stage between the source of signal $V_{in}$ and said switch for reasons well-known by those skilled in the art.

The other side of switch 3 is connected to the non-inverting + input of a second high impedance amplifier 5 and a second switch 4, wherein the other end of switch 4 is connected to ground. Switches 3 and 4 selectively routes signal $V_{in}$ via amplifier 2 to the non-inverting + input of amplifier 5 or grounds the non-inverting + input of amplifier 5. It should be noted that the drawing with respect to switches 3 and 4 only represent a switching function, which in an actual circuit would be done electronically by utilizing active devices similar to those described by Donald L. Wollesen in the Nov., 1960 National Semiconductor entitled "VHF Analog Switches." The output of amplifier 5 is connected back to the inverting − input of said second amplifier 5 and to the source electrode 6 of a MOS transistor 7.

MOS transistor 7 has its gate electrode 8 connected to a source of exciting voltage $V_g$. Substrate electrode 8' is connected to a source of bias potential $V_b$. Drain electrode 9 is connected to a capacitor 10, whose other terminal is connected to ground, and to the non-inverting + input of a third high impedance amplifier 11. Second amplifier 5 also serves as a buffer amplifier between switches 3 and 4 and said MOS transistor 7. Capacitor C10, having low dielectric absorption, is used to memorize the value of signal voltage during turn off time of MOS transistor 7 and along with the conductive resistance of MOS transistor 7 determine high frequency response. Typical values of C10 must therefore be small, say 70 picofarad. Further, FIG. 1 also shows a capacitor $C_{gd}$ (dotted lines) disposed between said gate electrode 8 and said drain electrode 9. Capacitor $C_{gd}$, an interelectrode capacitance of MOS transistor 7, electrostatically induces the exciting voltage $V_g$ to a load. Since the capacitor $C_{gd}$ is a stray capacitance of usually very small values of capacitance of about 1 picofarad, the exciting voltage $V_g$ is usually differentiated to become the so-called spike noise. The magnitudes of spike noise voltages are usually different from one another thus causing the offset voltage discussed at the beginning of this specification. Amplifier 11 serves as a buffer between MOS transistor 7, capacitor 10, and the following stages.

Continuing, the output of said third amplifier 11 is connected back to the inverting − input of said third amplifier, to the non-inverting + input of a first low drift operational amplifier 12, and to the non-inverting + input of a second low drift operational amplifier 13 respectively. The outputs of said first and second operational amplifiers are connected to third switch 14 and fourth switch 15 respectively. Operational amplifiers 12 and 13 are used to amplify voltages representing signal $V_{in}$ via said third amplifier and to serve as a buffer amplifier between said third and fourth switches and prior circuitry.

The other side of switches 14 and 15 are connected to low dielectric absorption capacitors 16 and 17, whose other terminals are connected to ground, and to source followers 18 and 19 respectively. As previously discussed for switches 3 and 4, switches 14 and 15 only represent a switching function, which in an actual circuit would be done electronically by utilizing active devices, etc. Switches 14 and 15 selectively select whether and when amplified voltages via first amplifier 12 or amplified voltages via second amplifier 13 reach an output amplifier 24. Capacitors 16 and 17 memorize any amplified voltage via switches 14 and 15 respectively. Source followers 18 and 19 provide a high impedance input so that capacitor 16 and capacitor 17 memorization time is quite long. In addition, source followers 18 and 19 provide drive to output amplifier 24 in accordance to any voltage memorized by capacitors 16 and 17 respectively. The output of source followers 18 and 19 are connected back to the inverting − inputs of said first opearational amplifier 12 and said second operational amplifier 3 respectively.

Further, the outputs of source followers 18 and 19 are connected to resistors 20 and 21, said resistors having their other ends connected to resistors 22 and 23 respectively. Resistors 20, 21, 22, and 23 have equal resistances which will be discussed later. Disposed between the junctions of resistors 20–22 and resistors 21–23, is a high gain output amplifier 24 having its non-inverting + input connected at the junction of resistors 20–22 and its inverting − input connected at the junction of resistors 21–23. The output of said output amplifier is connected to the other end of resistor 23 and provides an output voltage between output terminal C and ground terminal D. The output of said output amplifier is connected to an A/D converter.

As can be discerned from the above, two sampling means are provided. As was previously discussed, the value of capacitor 10 is small to obtain good high frequency response. However, since capacitor 10 is small, the memorizing time is short in duration. As the sample and hold system must memorize for a substantially long period of time, approximately 70 milliseconds for a typical A/D converter, a second memorizing means C16 and C17 is required, hence the second sample.

Previously stated in the summary, sampling is in response to a trigger pulse. A trigger pulse $T_g$ is applied to the system between an input terminal E and a ground terminal F. Trigger pulse $T_g$ drives a logic stage 25 having circuits therein to (1) control switches 3 and 4 as previously discussed, (2) control the timing of exciting voltage $V_g$ and (3) control the timing of switches 14 and 15. Logic stage 25 may be any of a plurality of circuits to time the system according to the timing diagrams shown in FIG. 2. A trigger signal $V_t$ is also generated by logic stage 25 to trigger the A/D converter for digitizing $V_{out}$.

To further understand operation of the system discussed above, reference to FIG. 1 and FIG. 2*a* should be made.

For single sampling, i.e., the input signal $V_{in}$ is sampled only once, first switch 3 and second switch 4 are alternately closed-open (positions shown) and vice versa respectively. In the closed-open position, input signal $V_{in}$ is applied to the source electrode 6 of MOS transistor 7 via amplifier 2 and switch 3. The positive edge of trigger pulse $T_g$ causes logic stage 25 to produce exciting voltage $V_g$. Exciting voltage $V_g$ biases MOS transistor 7 to the non-conducting state allowing memorizing capacitor 10 to memorize the voltage $V_{in} - V_9\, C_{gd}/C10$, where $V_{in}$, $V_g$, $C_{gd}$ and $C10$ are as previously defined. The voltage $V_g\, C_{gd}/C10$ is well-known by those skilled in the art.

Figure 2:
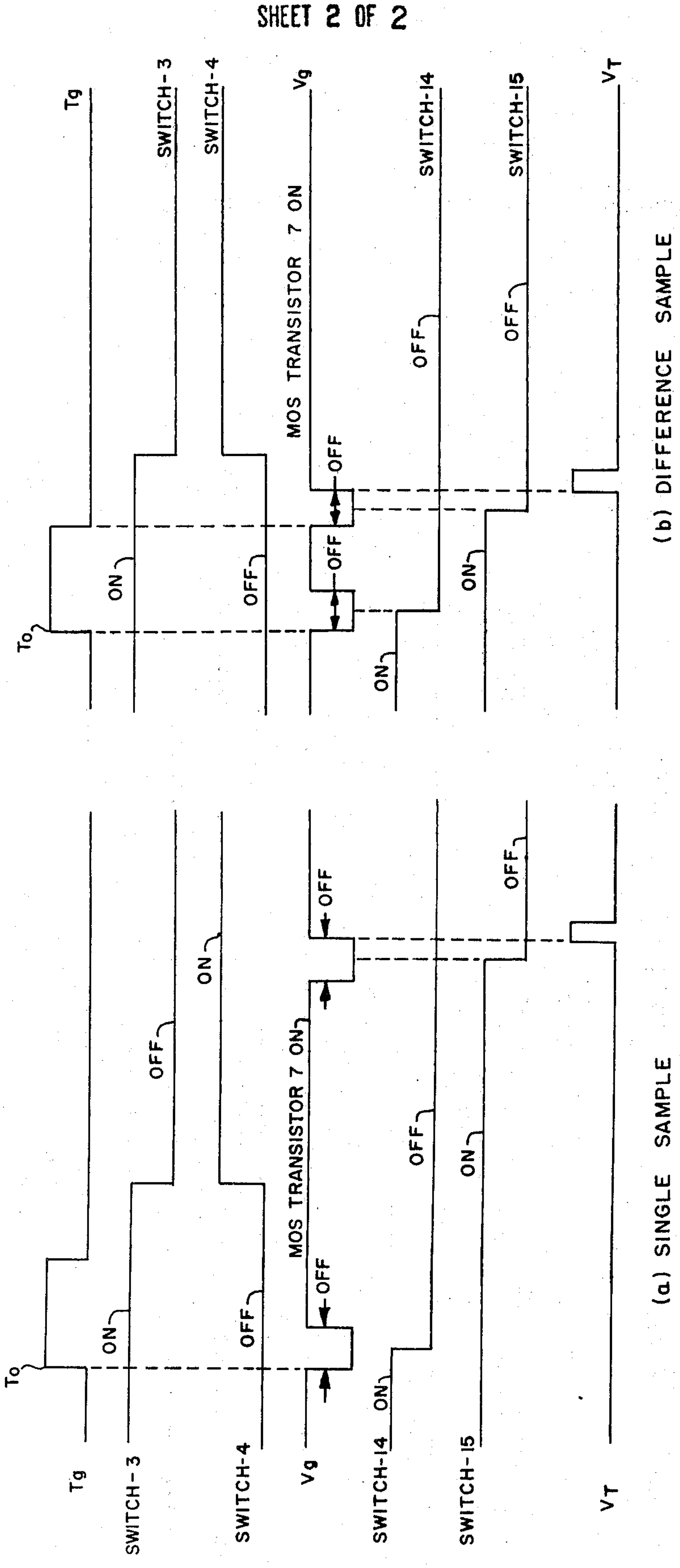
FIG. 2 is a timing diagram for the sample and hold system shown in FIG. 1.

The voltage $V_{in} - V_g\, C_{gd}/C10$ is therefore applied to the non-inverting + input of the output amplifier 24 via switch 14, closed as shown in FIG. 2. After amplifiers 11 and 12 and source follower 18 have stabilized, approximately 30 microseconds in a typical system, switch 14 is opened, and capacitor 16 memorizes as long as is required. After a short period of time, MOS transistor 7 returns to its conductive state. At a next predetermined time, with no relationship to the negative edge of trigger pulse $T_g$, switches 3 and 4 are open-closed, and a next independent exciting pulse $V_g$ causes MOS transistor 7 to be in a non-conducting state. Hence, capacitor C10 now memorizes the voltage $0 - V_g\, C_{gd}/C10$. This voltage is applied to inverting − input of output amplifier 24 via amplifier 13 and switch 15. After amplifiers 11 and 13 and source follower 19 have stabilized, switch 15 is opened and capacitor 17 memorizes as long as is required.

As resistors 20, 21, 22 and 23 are of equal value, output amplifier 24 therefore computes a voltage $V_{out}$ which is equal to the voltage at the non-inverting + input of said output amplifier due to memorizing capacitor 16 minus the voltage at the inverting input of said output amplifier due to memorizing capacitor 17. Output signal $V_{out}$ is therefore equal to $V_{in} - V_g\, C_{gd}/C10 - [-V_g\, C_{gd}/C10]$ or, $V_{out}$ equal $V_{in}$. $V_{out}$ is therefore applied to the A/D converter along with trigger signal $V_t$ that is generated after switch 15 is opened. As can be discerned from the above, the output voltage applied to the A/D converter is free of said spike noise, DC offset voltage and is independent of temperature variations.

For difference sampling, i.e., the input signal will be sampled twice, once corresponding to the positive edge of trigger pulse $T_g$ and once at the negative edge of trigger pulse $T_g$. Operation is similar to that described for single sampling, except that switch 3 is always closed and switch 4 is always open. As can be discerned from referring to FIG. 2b, the output signal $V_{out}$ is therefore equal to $V_{in}$ on the positive edge of trigger pulse $T_g$ and equal to $-V_{in}$ on the negative edge of trigger pulse $T_g$. Here again, as in single sampling, output voltage $V_{out}$ is free from said spike noise, DC offset voltage and is independent of temperature variations.

Throughout this description, no mention as to supplying power to the amplifiers, logic stages, etc., has been discussed. As it is well-known by those skilled in that art it is there deemed obvious.

While there has been shown and described the preferred embodiment of the present invention, it will be apparent to those skilled in the art that many changes and modifications may be made without departing therefrom in its broader aspects. Therefore, the appended claims are intended to cover all such changes and modifications as fall within the true spirit and scope of this invention.

This invention is claimed in accordance with the following:

1. A high speed sample and hold system comprising:

input signal first amplifying means for amplifying input signals;

switch means for switching said amplified signals and supplying output signals therefrom;

second amplifier means for amplifying said output signals and supplying second output signals therefrom;

sampling means for receiving said second output signals and a control signal for supplying sampled output voltages therefrom;

first memorizing means to memorize said sampled output voltages and supplying said memorized voltages therefrom;

third amplifying means for receiving said memorized voltages and supplying amplified voltages therefrom;

fourth amplifying means for receiving said amplified voltages and supplying drive voltage therefrom wherein said means comprise second switch means for switching said amplified voltages, means for memorizing said switched amplified voltages, and means for providing said drive voltage;

fifth amplifying means for receiving said amplified voltages and supplying drive voltage therefrom wherein said means comprise third switch means for switching said amplified voltages, means for memorizing said switched amplified voltages, and means for providing said drive voltage; and sixth amplifying means for receiving said drive voltages and supplying sampled output voltages therefrom wherein said output voltage is proportional to the substraction of said input drive voltages.

2. The high speed sample and hold system according to claim 1 wherein said first, second, and third amplifying means defines high impedance, high frequency amplifiers.

3. The first, second, and third amplifiers according to claim 2 wherein said high impedance, high frequency amplifiers consists of at least one field effect transistor and one bipolar transistor.

4. The high speed sampling system according to claim 1 wherein said sampling means is an active device defining a field effect semiconductor having as a portion thereof a source electrode, a drain electrode, an insulated gate, and a substrate.

5. The field effect semiconductor according to claim 4 wherein said active device defines a MOS-FET.

6. The high speed sampling system according to claim 1 wherein said first, second, and third memorizing means defines an impedance means.

7. The memorizing means according to claim 6 wherein said impedance means defines a capacitor.

8 The high speed sampling system according to claim 1 wherein said first, second, and third switching means defines an electronic switching means.

9. The switching means according to claim 8 wherein said electronic switching means defines a field effect transistor.

10. The switching means according to claim 8 wherein said electronic switching means defines a bipolar transistor.

11. The switching means according to claim 8 wherein said electronic switching means defines a field effect transistor and a bipolar transistor.

12. The high speed sampling system according to claim 1 wherein said fourth, fifth, and sixth amplifying means defines high gain amplifiers.

13. The fourth, fifth and sixth amplifying means according to claim 12 wherein said high gain amplifiers defines differential amplifiers.

14. The method of digitizing high frequency signals, comprising:

applying first and second signals to first and second input terminals respectively;

sampling said first signal or a reference signal alternately in response to said second signal;

memorizing said sampled first signal in a first memorizing means;

memorizing said sampled reference signal in a second memorizing means;

amplifying the difference betweeen said memorized reference signals; and applying said amplified difference to means for displaying said amplified difference in a digital form.

15. The method according to claim 14 wherein sampling said first signal or a reference signal alternately in response to said second signal defines controllably operating a MOS-field effect transistor having as a portion thereof a source electrode, a drain electrode, an insulated gate, and a substrate.

16. The method of digitizing high frequency signals, comprising:

applying first and second signals to first and second input terminals respectively;

sampling said first signal alternately in response to the state of said second signal;

memorizing said sampled first signal alternately in first and second memorizing means in response to the state of said second signal;

amplifying the difference between said alternately memorized first signal; and applying said amplified difference to means for displaying said amplified difference in a digital form.

17. The method according to claim 16 wherein sampling said first signal alternately in response to the state of said second signal defines controllably operating a Mos-field effect transistor having as a portion thereof a source electrode, a drain electrode, an insulated gate, and a substrate.

* * * * *